Dec. 21, 1943.     A. KOK     2,337,394
FRUIT ORIENTING DEVICE
Filed Oct. 8, 1941     2 Sheets-Sheet 1
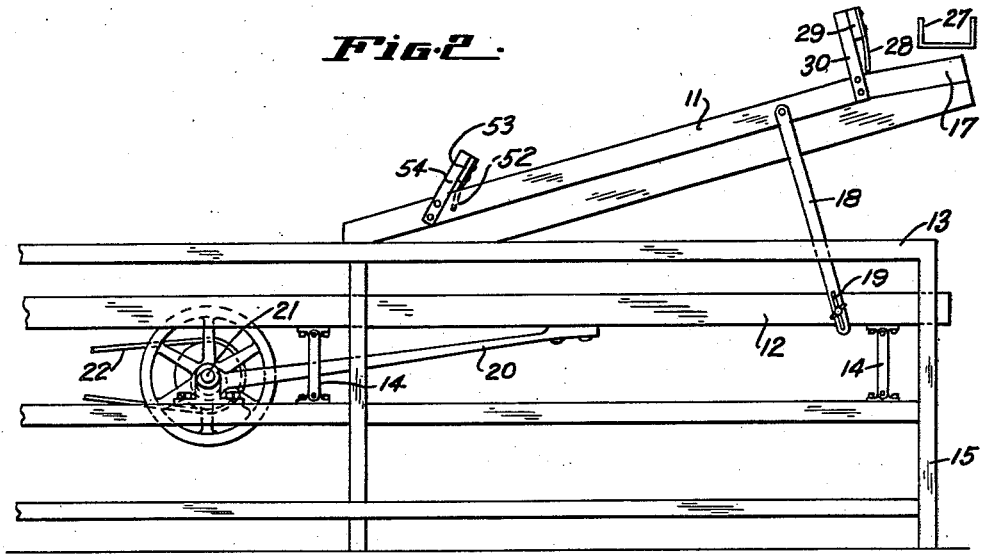
INVENTOR.
ALBERT KOK
BY
ATTORNEYS.

Dec. 21, 1943.   A. KOK   2,337,394
FRUIT ORIENTING DEVICE
Filed Oct. 8, 1941   2 Sheets-Sheet 2
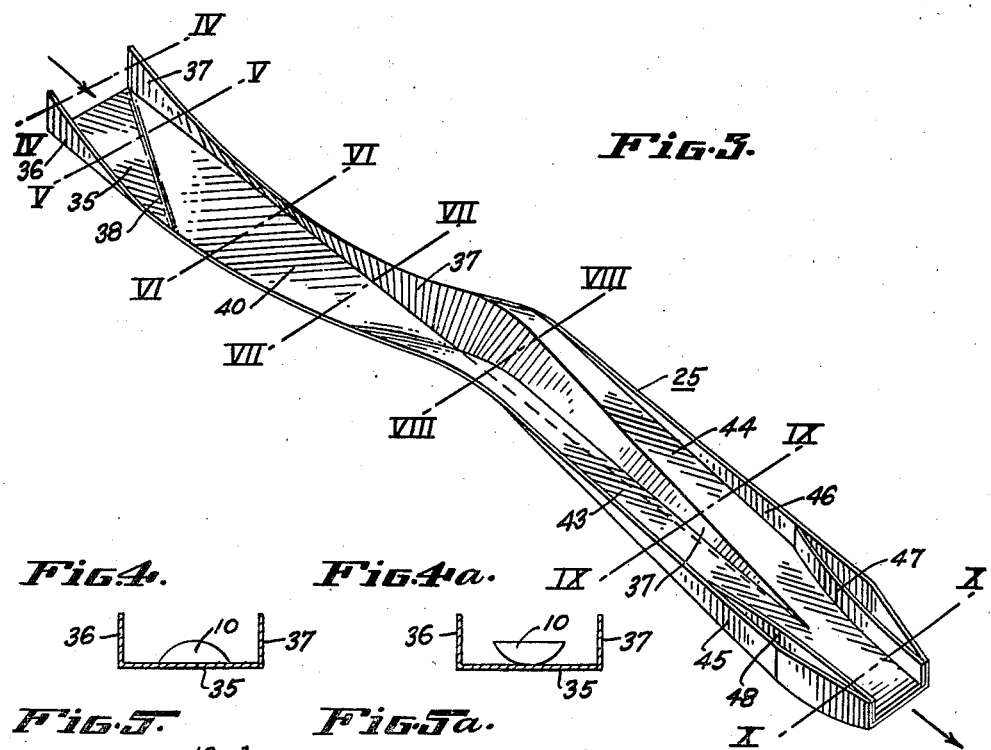
INVENTOR.
ALBERT KOK
BY
Naylor and Lassagne
ATTORNEYS Patented Dec. 21, 1943

2,337,394

UNITED STATES PATENT OFFICE 2,337,394

FRUIT ORIENTING DEVICE

Albert Kok, Menlo Park, Calif.

Application October 8, 1941, Serial No. 414,068

9 Claims. (Cl. 198—33)

This invention relates to fruit orienting devices and more particularly to means for automatically turning fruit sections as an incident of the processing or canning of the same.

In the canning and packing of fruit, it is well-known that several varieties such as peaches, pears, apples, and possibly other pit or core-containing fruits, are frequently pitted and cored in an initial stage of the process. Generally the fruit is also halved in this step and delivered to a conveyor or receptacle of some sort for transportation to some remote part of the plant for further processing. The fruit sections are consistently delivered with their pit or core cavities arranged indiscriminately, that is to say, facing upwardly and downwardly.

It is desirable in many types of processes that, intermediate the pitting or coring step and further processing, the fruit sections be uniformly arranged, as for example, with their pit or core cavities turned downwardly.

It is therefore an object of this invention to provide wholly automatic means which will receive fruit sections with their cavities irregularly arranged and turn those which need to be turned to produce the requisite degree of uniformity of position.

In terms of general inclusion, this and other objects of the invention are attained through the provision of guide means which will act to invert fruit improperly disposed while avoiding turnover of properly disposed fruit sections. More specifically the invention comprises a guide means adapted to raise all of the fruit sections to an edgewise position and then flip over those which were originally improperly positioned while flipping back those pieces originally properly positioned.

Other objects of the invention will become apparent as this specification proceeds.

In the drawings wherein a preferred form of the invention is illustrated:

Figure 1 is a top plan view of the device;

Figure 2 is a side elevation of a machine embodying the fruit orienting means;

Figure 3 is a perspective view of one of the fruit section guides;

Figures 4 to 10, inclusive, are sequential transverse sectional views of one of the guide means, taken on the lines 4—4, 5—5, 6—6, 7—7, 8—8, 9—9, and 10—10 of Figure 3 to show progress therethrough of a fruit section originally properly positioned; and Figures 4a to 10a, inclusive, are views corresponding to Figures 4 to 10, inclusive, to show progress through the guide means of a fruit section originally improperly positioned.

For purposes of illustration, I have chosen a peach half 10 as the fruit section to be acted upon by the device forming the subject matter hereof. It is well-known that a peach half is substantially semi-spherical in shape and has a flat, cut side produced in the halving thereof, with an exposed, half-pit cavity. It is the purpose of this invention to turn such fruit halves with their flat sides facing downwardly, or in other words, to invert the fruit (see Figures 10 and 10a).

The turnover means devised to act upon the indiscriminately arranged fruit sections is disposed within a frame 11 and may be supported, as shown in Figure 2, on a shaker bed 12 pivotally connected to a main frame 13 by means of props 14.

The frame 13 is, in turn, supported on the conventional legs 15. Since the fruit sections are caused to pass through the turnover 16 by gravity, supplemented by the hereinafter described shaker motion imparted to frame 11, it is desirable to provide means for raising the intake end 17 of the device to produce the required degree of inclination, shown in Figure 2 as a pair of rods 18. The lower ends of the rods 18 are slotted, as at 19, to obtain an adjustable connection to shaker bed 12 by such means as a conventional wing nut. In this manner the inclination of frame 11 may be varied to suit different conditions.

Shaking motion is imparted to bed 12 and hence to frame 11 by means of the pitman 20 having an eccentric connection to a shaft 21, the latter being driven in any conventional manner such as by a belt 22 having an operative connection to a prime mover (not shown).

The turnover 16 comprises a plurality of fruit section guides 25, one of which is shown in perspective in Figure 3, arranged in side-by-side relation within and extending longitudinally of the frame 11. A plate 26, secured within the frame 11 and flush with the intake ends of the guides 25, is adapted to receive the indiscriminately arranged fruit sections discharged thereon by any means, such as the chute 27 (see Figure 2). Due to the incline of frame 11 and the members supported thereby, namely, plate 26 and guides 25, plus the shaker motion imparted by the pitman 20, the indiscriminately arranged fruit sections will be urged across plate 26 toward the intake ends of guides 25. As a means of regulating the movement of the fruit sections into the guides 25, I have provided a transversely extending flexible flap or drag 28, which may be of a material such as rubber, dependent from a bar 29 supported by posts 30 on either side of frame 11.

As heretofore stated, the turnover 16 inverts fruit sections improperly positioned while avoiding upset of fruit originally properly positioned. This can be best understood from a step-by-step description of the movement of the correctly and incorrectly arranged fruit sections through one of the guides 25, in which the characteristics of the latter may be made to more fully appear.

The intake end of the guide 25 is defined by a bottom 35, flush with the plate 26, and the side walls 36 and 37 (see Figures 4 and 4a). As will be noted from Figures 4 and 4a, the correctly and incorrectly positioned fruit sections 10, respectively, move over bottom 35 smoothly, as it is but a continuation of the plane surface of plate 26.

As the fruit sections move forwardly over bottom 35, they reach the diagonally extending bend 38 therein at which point the bottom is tipped downwardly to define a side 40 of a V-shaped chute (see Figures 5 and 5a). The other side of the V-shaped chute is defined by side 37 which, commencing at this point, is inclined from the vertical toward bottom 35.

As will be noted from Figure 3, the diagonal bend 38 commences just within the intake end of guide 25; its inner end terminates at the opposite edge of bottom 35, a relatively short distance from the intake end. Coincident with the bending of bottom 35 along line 38, side 36 is diminished to a point of complete elimination as no longer necessary since bottom 35 eventually merges into side 40 of the V-shaped chute (see Figures 3, 5, 5a, 6, and 6a). It is at this point of merging of bottom 35 into side 40 that the fruit sections 10 are first tipped. As shown in Figure 6, fruit sections originally correctly positioned merely slide with their cut faces downwardly on side 40 of the V-shaped trough. Fruit sections originally incorrectly positioned, however, slide onto side 40 on their rounded or semi-spherical sides with their opposite or cut sides disposed toward side 37 of the V-shaped chute (see Figure 6a).

At this point, it should be noted that the principal purpose of tipping the vertical axis of the V of the chute from a vertical plane is to provide a chute into which the fruit will and must be fed edgewise and thus effectively prevent straddling of the chute by the fruit sections. I am aware that in the prior art attempts have been made to employ V-shaped chutes having their vertical axes arranged on vertical plane, but it has been noted that they proved unsatisfactory because an exceedingly large number of fruit sections straddled the chute and were not turned at all; or, if turned, they were turned incorrectly.

Continued forward movement of the fruit sections brings them into that portion of the guide 25 illustrated in Figures 7 and 7a, wherein the side wall 37 is raised back to a substantially vertical position, while side 40 has been raised to a position on the order of 45 degrees. Here the fruit section 10, originally correctly positioned, is shown (Figure 7) as moving through the guide 25 with its cut face sliding on side 40. The fruit section originally incorrectly positioned has now been tipped upwardly, by the raising of side 40, to a point where its center of gravity has passed dead center and the fruit has fallen over and come to rest with its cut face disposed against side 37 and the lower portion only of its semi-spherical side in contact with side 40. (See Figure 7a.)

With the fruit disposed as shown in Figures 7 and 7a, it is only necessary to lower the sides 40 and 37 to correctly position all fruit sections, that is, with their cut faces down. This is accomplished by gradual reduction of the depth of the V-shaped chute and the provision of laterally disposed plane surfaces onto which the respective fruit sections may fall as they emerge from the chute.

Thus in Figures 8 and 8a side wall 37 is shown to have been lowered from the vertical position of Figures 7 and 7a to approximately 45 degrees, and the upper edges of sides 40 and 37 have been bent outwardly to define the beginning of the ledges 43 and 44.

In Figures 9 and 9a, the depth of the V-shaped chute defined by sides 40 and 37 has been further reduced to a point where a considerable portion of the fruit sections 10 supported therein is exposed, while ledges 43 and 44 have been widened and their outer edges bent upwardly to define sides 45 and 46, respectively.

The V-shaped chute defined by sides 40 and 37 tapers out short of the end of guide 25 (see Figure 3), and the fruit sections 10, in moving therethrough, fall of their own weight to rest on their cut faces on plane surfaces 43 and 44 as will be understood from Figures 9 and 9a, the fruit sections originally correctly positioned drop onto ledge 43, while those incorrectly positioned fall onto ledge 44.

In the further treatment and processing of the fruit, it will be sometimes desirable to discharge the fruit sections in single file. For that reason, side walls 45 and 46 may be converged to the approximate width of a single fruit section, or this may be accomplished by the means shown in Figures 3, 10, and 10a, namely, insert strips 47 and 48 disposed within the guide 25 and secured to the side walls 45 and 46. In Figure 1, I show the discharge of fruit sections in a plurality of lines from the turnover 16 to pass between longitudinally arranged guide bars 50 in the course of movement toward further treatment.

As shown in Figure 3, the discharge ends of guides 25 in the turnover 16 are slightly upturned to insure complete discharge therefrom in the way of a short drop from the extreme edge.

In Figure 2, adjacent the discharge end of frame 11, there is shown a second means for regulating the movement of fruit through the turnover 16 consisting of a plurality of flexible flaps or drags 52 extending into the guides 25 and dependent from a transversely disposed bar 53 supported by posts 54 secured to the frame 11. This mechanism serves the purpose of decreasing the speed with which the fruit sections move through the turnover 16 and thus to prevent jams at its discharge end.

It has been observed that in actual use the turnover forming the subject matter of this application has an unusually large capacity. Additionally, it has been noted that, due to the combined gravity run and shaker motion, the fruit progresses through the turnover 16 at a rapid rate, partly sliding and partly rolling edgewise over the several surfaces of the device.

It will be obvious to those skilled in the art that the fruit orienting device forming the subject matter hereof is highly efficient for the purpose intended. Likewise, it will be appreciated that many changes and modifications may be made in the device without departing from the spirit of the invention. Therefore, full protection is desired according to the scope of the appended claims.

The invention claimed is:

1. A device for orienting fruit comprising a guide having a flat bottom at its intake end, said bottom merging into a chute substantially V-shaped in cross section, the vertical axis of the V of said chute being successively tipped from a vertical plane for a portion of its length and raised to a vertical plane for the remainder of its length, the V of said chute being of a diminishing depth from approximately the point at which it is raised to a vertical plane to its discharge end, and a ledge provided on each of the two sides of the V-shaped chute from the point at which the diminishment of its depth commences to its discharge end.

2. A device for orienting fruit comprising a guide having a flat bottom at its intake end, said bottom merging into a chute substantially V-shaped in cross section, the vertical axis of the V of said chute being tipped from a vertical plane for a portion of its length and raised to a vertical plane for the remainder of its length, the V of said chute being of a diminishing depth from approximately the point at which it is raised to a vertical plane to its discharge end, and a ledge provided on each of the two sides of the V-shaped chute from the point at which the diminishment of its depth commences to its discharge end, said ledge being of a width increasing coincidentally with the diminishment of the depth of said V.

3. A device for orienting fruit comprising a guide having a flat bottom at its intake end, said bottom merging into a chute substantially V-shaped in cross section, the vertical axis of the V of said chute being tipped from a vertical plane for a portion of its length and raised to a vertical plane for the remainder of its length, the V of said chute being of a diminishing depth from approximately the point at which it is raised to a vertical plane to its discharge end, the upper ends of the V of said chute being bent outwardly from the point at which the diminishment of its depth commences to its discharge end to provide a ledge on the two sides of the V of a width increasing coincidentally with the diminishment of the depth of said V.

4. A device for orienting fruit comprising a guide having a flat bottom at its intake end, said bottom merging into a chute substantially V-shaped in cross section, the vertical axis of the V of said chute being tipped from a vertical plane for a portion of its length and raised to a vertical plane for the remainder of its length, the V of said chute being of a diminishing depth from approximately the point at which it is raised to a vertical plane to its discharge end, a ledge provided on each of the two sides of the V-shaped chute from the point at which the diminishment of its depth commences to its discharge end, and side walls for said ledge.

5. In combination, a device for orienting fruit having a frame, a plurality of guides arranged in side-by-side relation within the frame, each of said guides comprising a chute substantially V-shaped in cross section for the greater portion of its length, with the vertical axis of the V tipped from a vertical plane adjacent its entrance end and tipped to a vertical plane at another portion intermediate its ends, and a plate in the frame adapted to receive indiscriminately arranged fruit sections, each of said guides having a portion of their respective entrance ends flush with said plate.

6. In combination, a device for orienting fruit having a frame, a plurality of guides arranged in side-by-side relation within the frame, each of said guides comprising a chute substantially V-shaped in cross section for the greater portion of its length, with the vertical axis of the V tipped from a vertical plane adjacent its entrance end and tipped to a vertical plane at another portion intermediate its ends, a plate in the frame adapted to receive indiscriminately arranged fruit sections, each of said guides having a portion of their respective entrance ends flush with said plate, a support for the frame, and means for imparting a shaking motion to the frame.

7. In combination, a device for orienting fruit having a frame, a plurality of guides arranged in side-by-side relation within the frame, each of said guides comprising a chute substantially V-shaped in cross section for the greater portion of its length, with the vertical axis of the V tipped from a vertical plane adjacent its entrance end and tipped to a vertical plane at another portion intermediate its ends, a plate in the frame adapted to receive indiscriminately arranged fruit sections, each of said guides having a portion of their respective entrance ends flush with said plate, a support for the frame, means for varying the inclination of the frame with respect to its support, and means for imparting a shaking motion to the frame.

8. In a device for orienting fruit, a frame, a plurality of guides arranged in side by side relation within the frame, each of said guides comprising a chute substantially V-shaped in cross section for the greater portion of its length, with the vertical axis of the V tipped from a vertical plane adjacent its entrance end and tipped to a vertical plane at another portion intermediate its ends, a plate in the frame spanning the entrance ends of the guides and adapted to receive indiscriminately arranged fruit sections, each of said chutes having a portion of their respective entrance ends flush with said plate.

9. In a device for orienting fruit, a frame, a plurality of guides arranged in side by side relation within the frame, each of said guides comprising a chute substantially V-shaped in cross section for the greater portion of its length, with the vertical axis of the V tipped from a vertical plane adjacent its entrance end and tipped to a vertical plane at another portion intermediate its ends, a plate in the frame spanning the entrance ends of the guides and adapted to receive indiscriminately arranged fruit sections, the entrance ends of said chutes having a bottom flush with said plate and a diagonal bend therein in proximity to the point of entrance to merge with a wall of the V as tipped from the vertical plane.

ALBERT KOK.